(12) United States Patent
Choi et al.

(10) Patent No.: US 8,672,299 B2
(45) Date of Patent: Mar. 18, 2014

(54) HUMIDIFIER

(75) Inventors: Yong Hyuk Choi, Seoul (KR); Yo Sang Jung, Seoul (KR); Chin Hyuk Chang, Seoul (KR)

(73) Assignee: LG Electronics Inc., Seoul (KR)

( * ) Notice: Subject to any disclaimer, the term of this patent is extended or adjusted under 35 U.S.C. 154(b) by 371 days.

(21) Appl. No.: 13/131,844

(22) PCT Filed: Dec. 31, 2008

(86) PCT No.: PCT/KR2008/007827
§ 371 (c)(1),
(2), (4) Date: Aug. 16, 2011

(87) PCT Pub. No.: WO2010/062003
PCT Pub. Date: Jun. 3, 2010

(65) Prior Publication Data
US 2011/0291305 A1  Dec. 1, 2011

(30) Foreign Application Priority Data
Nov. 28, 2008 (KR) ........................ 10-2008-0120007

(51) Int. Cl.
*B01F 3/04* (2006.01)
(52) U.S. Cl.
USPC ............. 261/30; 261/99; 261/107; 261/119.1
(58) Field of Classification Search
USPC ........................... 261/30, 99, 100, 107, 119.1
See application file for complete search history.

(56) References Cited

U.S. PATENT DOCUMENTS 4,056,049 A   11/1977   Stuckey

FOREIGN PATENT DOCUMENTS

| CN | 1724949 A | 1/2006 |
|---|---|---|
| EP | 1450112 | 8/2004 |
| JP | 2004-233022 | 8/2004 |
| JP | 2006-317086 | 11/2006 |
| JP | 2008064429 A * | 3/2008 |
| JP | 2008-082560 | 4/2008 |
| KR | 2003-0074203 | 9/2003 |

\* cited by examiner

*Primary Examiner* — Robert A Hopkins
(74) *Attorney, Agent, or Firm* — McKenna Long & Aldridge LLP (57) ABSTRACT

Disclosed herein is a humidifier. The humidifier includes a rear casing, a front casing placed in front of the rear casing and having an opening formed on its front side, a fan housing having an air intake unit formed on its front side, wherein an air blower unit is formed on one side of a circumference part of the fan housing, a humidification filter placed in front of the air intake unit, and a water tank placed on a side of the humidification filter. The fan housing has a partition wall projected therefrom between the humidification filter and the water tank, and the partition wall partitions a front side of the fan housing into a space through which air passes and a space where the water tank is placed.

10 Claims, 9 Drawing Sheets

HUMIDIFIER

This Application is a 35 U.S.C. §371 National Stage Entry of International Application No.: PCT/KR2008/007827, filed on Dec. 31, 2008, which claims priority to Korean Patent Application No: 10-2008-0120007, filed on Nov. 28, 2008, both of which are hereby incorporated by reference in their entirety for all purposes as if fully set forth herein.

TECHNICAL FIELD

The present invention relates to a humidifier including a fan housing, which is formed within the main body of the humidifier and has a partition wall for partitioning the space of the main body into space into which air is sucked and space where a water tank is placed.

BACKGROUND ART

In general, a humidifier is configured to suck a dry indoor air, humidify the sucked air, and then blow the humidified air into a room. That is, the humidifier is based on the principle that clear water is changed to particles by electricity and then blown into a room. Accordingly, since an indoor air continues to have an adequate level of humidity, respiratory distress and diseases can be prevented and a pleasant indoor ambient can be maintained.

Humidifiers may be divided into an ultrasonic humidifier, a heating type humidifier, a combined type humidifier, etc. depending on humidification methods.

The ultrasonic humidifier uses a method of generating ultrasonic waves at the lower portion of a water tank, splitting water into small particles, and blowing the split water particles to the outside. Here, steam blown by the humidifier is cool steam. The heating type humidifier uses a method of boiling water within the humidifier and blowing the boiled water particles as steam. Here, steam blown by the humidifier is hot steam. The combined type humidifier uses a combination of the ultrasonic type and the heating type in order to take advantages of the heating type and the ultrasonic type. The combined type humidifier uses a method of raising water temperature in a heating pipe, sterilizing the water, and then blowing the sterilized using ultrasonic waves. In the combined type humidifier, warm steam and cool steam may be selected according to circumstances.

The humidifier indispensably includes a water tank for supplying water to a main body. Generally, the inside of the main body is divided into space in which the water tank is placed and space where sucked air flows.

However, a conventional humidifier has a problem in that it has a low humidification performance because the space in which the water tank is placed and the space where sucked air flows are not partitioned and the flow of air within the main body is not smooth. The conventional humidifier is also problematic in that noise is generated because air flowing within the main body flows toward the water tank.

DISCLOSURE

Technical Problem

It is, therefore, an object of the present invention to provide a humidifier, including a fan housing in which a partition wall, which is capable of partitioning the space of a main body into space where air flows and space where a water tank is placed, is formed.

Technical Solution

In accordance with an embodiment of the present invention, there is provided a humidifier, including a rear casing, a front casing placed in front of the rear casing and having an opening formed on its front side, a fan housing having an air intake unit formed on its front side, wherein an air blower unit is formed on one side of a circumference part of the fan housing, a humidification filter placed in front of the air intake unit, and a water tank placed on a side of the humidification filter. The fan housing has a partition wall projected therefrom between the humidification filter and the water tank, and the partition wall partitions a front side of the fan housing into a space through which air passes and a space where the water tank is placed.

The humidification filter settlement units for fixing the humidification filter may be formed on the fan housing.

Further, the water tank may have a backward projection portion formed in one of its right and left sides, and a space into which the projection portion is inserted and accommodated may be formed between the fan housing and the rear casing. The water tank may have a depressed portion formed on its front side, and a handle may be formed in the depressed portion.

Meanwhile, locking projections may be formed in the front casing, and latch grooves to which the respective locking projections are led and latched are formed in the water tank. The latch grooves may include a locking portion with which each of the locking projections is engaged, and a guide portion led to each of the locking projections.

The humidifier may further include a control box for controlling the humidifier. The control box is placed on an upper side of the partition wall.

Ribs may be formed on a surface in contact with the water tank of the partition wall. Ribs are formed on a surface adjacent to the water tank, of a front side of the fan housing.

Meanwhile, the humidifier may further include an accommodation unit into which a bottom of the humidification filter is inserted, and a water guide including a water tank settlement unit in which the water tank is settled. A rear side of the accommodation unit is depressed in a forward direction, thus forming a space in which a bottom of the fan housing is placed.

Advantageous Effects

The humidifier having the above construction according to an embodiment of the present invention has the following advantages.

First, space within the main body is partitioned into space where air flows and space into which the water tank is inserted by the partition wall. Accordingly, flowability performance of air can be improved and humidification performance of the humidifier can be improved.

Second, noise, which is generated when air flows near the water tank, can be removed because air flowing within the main body is prevented from flowing toward the water tank.

Third, in the case in which the water tank is inserted into the main body, the partition wall guides the insertion of the water tank, thereby facilitating the insertion of the water tank. Further, after the water tank is inserted, the partition wall supports the water tank, so the water tank can be stably placed within the main body.

BEST MODE

Hereinafter, embodiments of the present invention will be described in detail with reference to the accompanying drawings so that they can be readily implemented by those skilled in the art.

Figure 1:
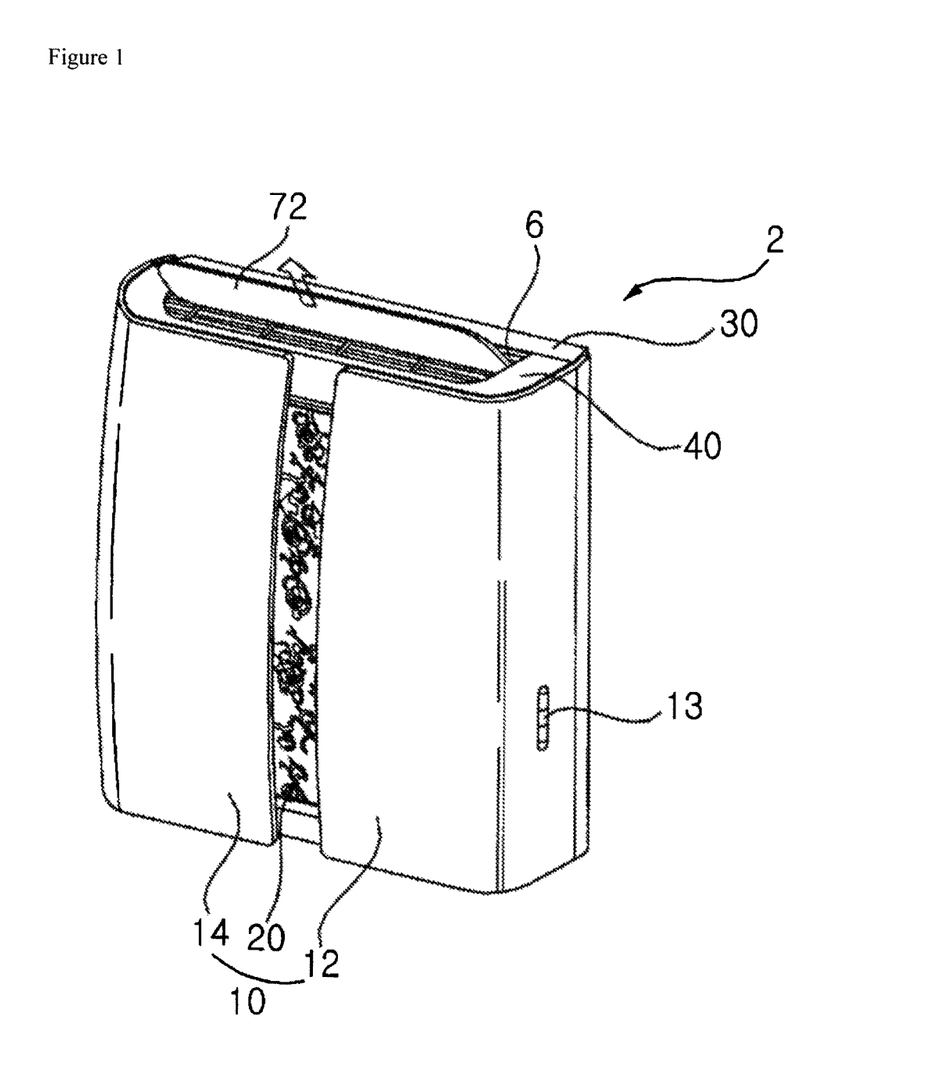
FIG. 1 is a perspective view showing a humidifier according to an embodiment of the present invention.
Figure 2:
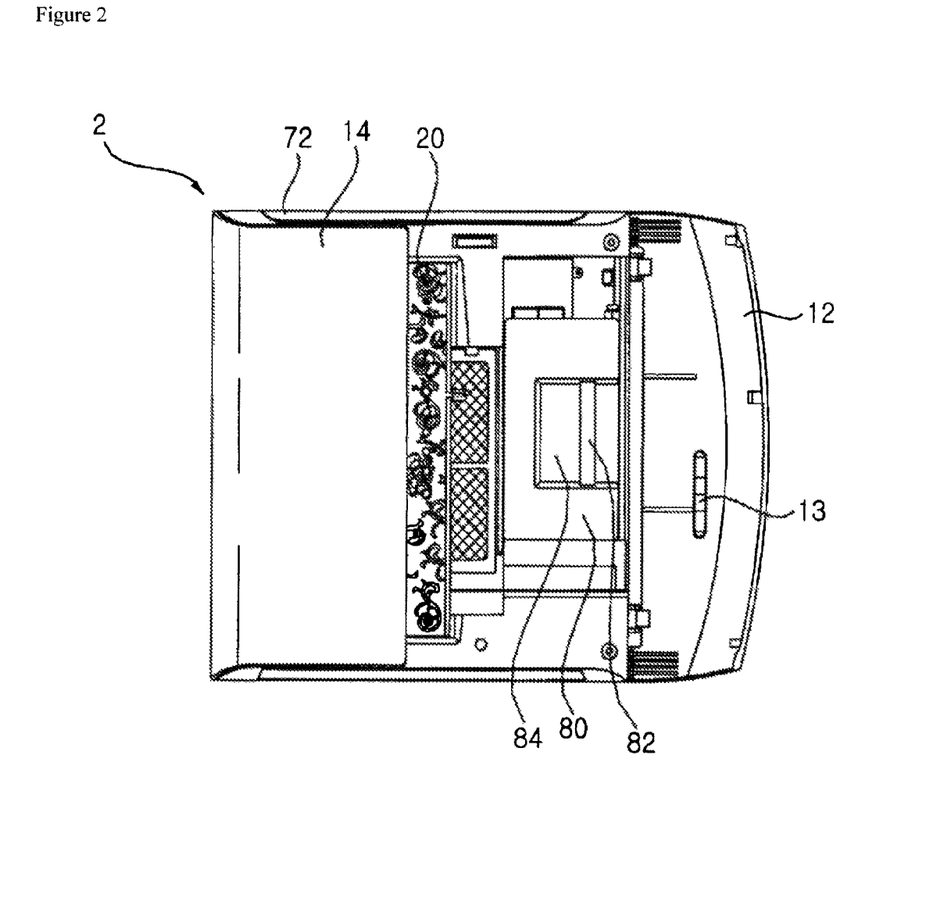
FIG. 2 is a front view of the humidifier according to the present embodiment when a right door is opened.
Figure 3:
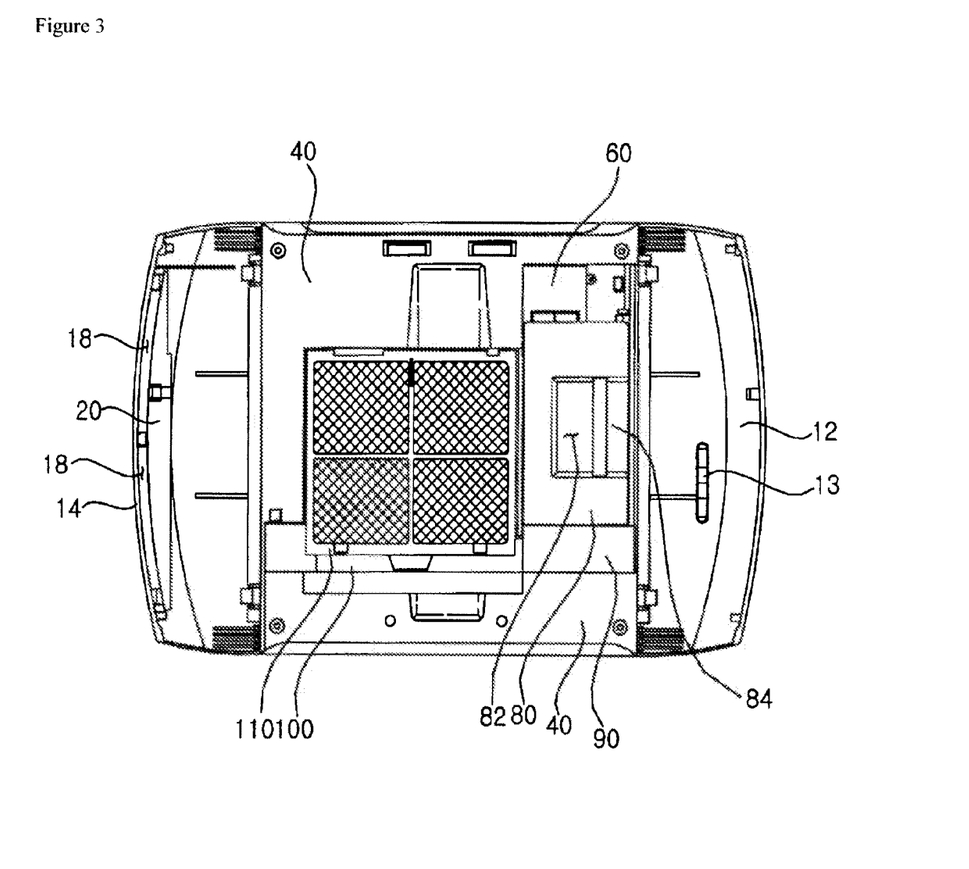
FIG. 3 is a front view of the humidifier according to the present embodiment when the right and left doors are opened.
Figure 4:
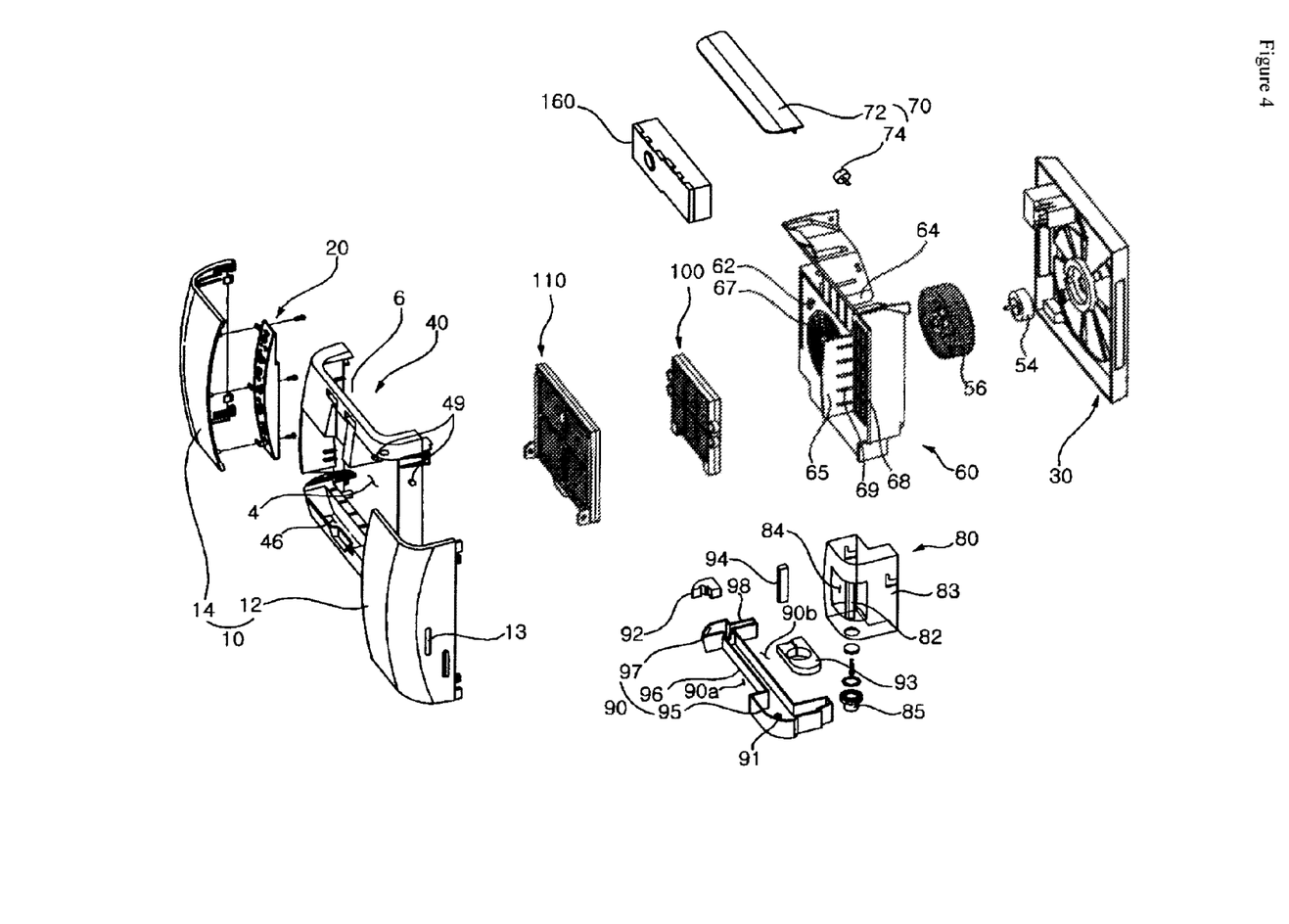
FIG. 4 is an exploded perspective view of the humidifier according to the present embodiment.
Figure 5:
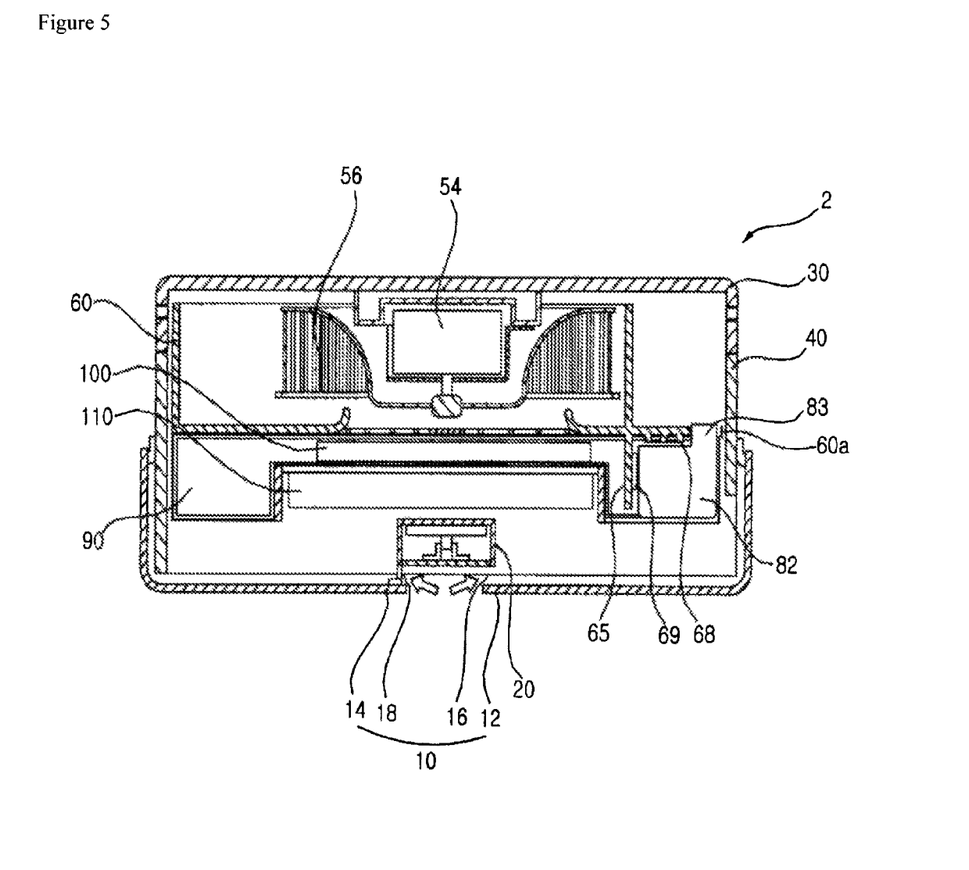
FIG. 5 is a lateral cross-sectional view of the humidifier according to the present embodiment.
Figure 6:
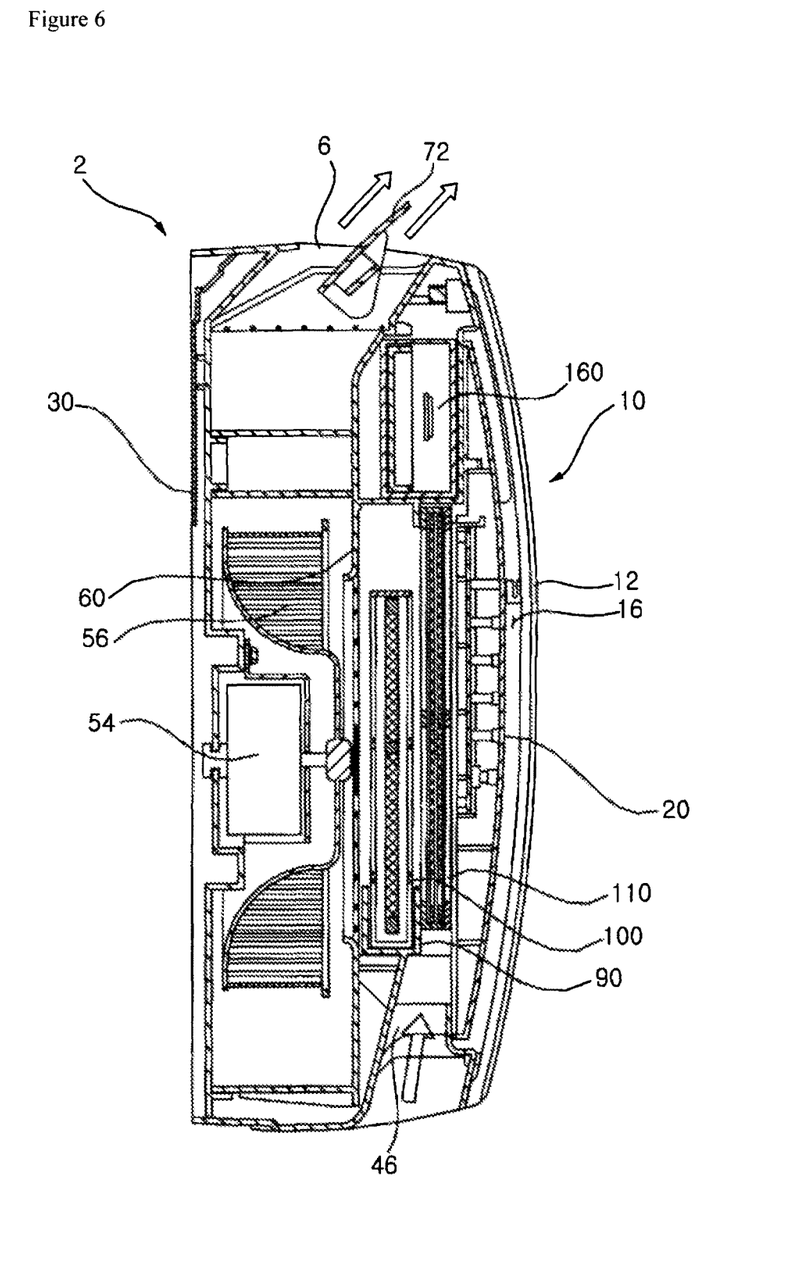
FIG. 6 is a longitudinal cross-sectional view of an air conditioner according to the present embodiment.
Figure 7:
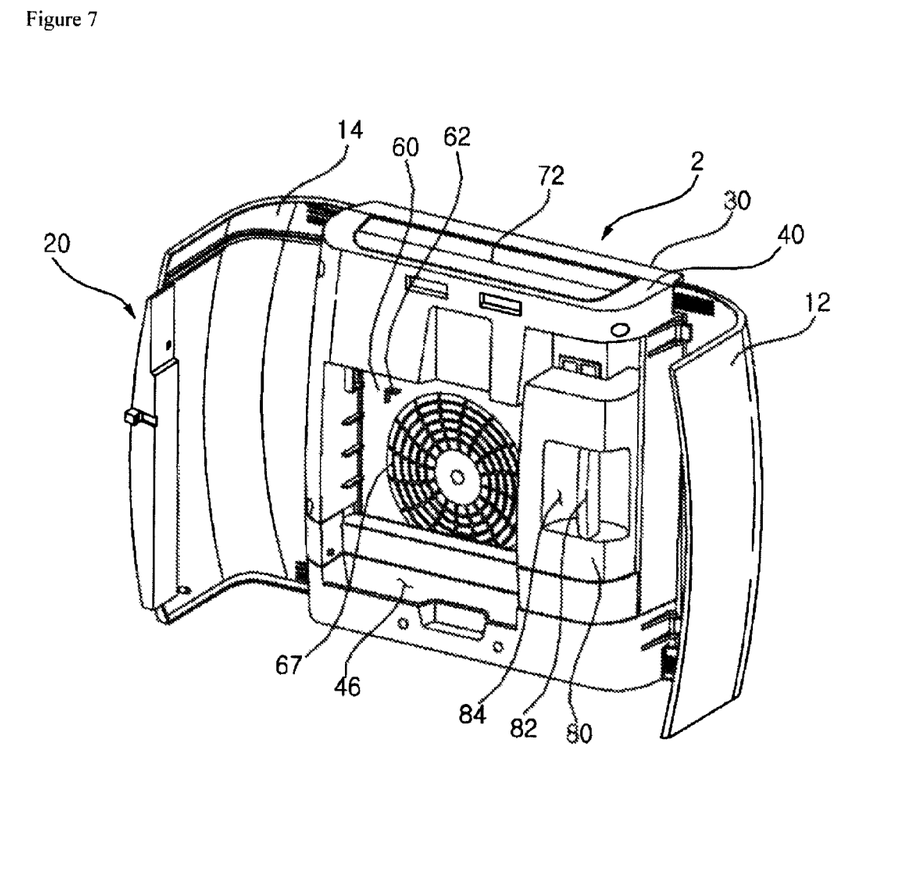
FIG. 7 is a perspective view of the humidifier from which a purification filter and a humidification filter are detached in the present embodiment.
Figure 8:
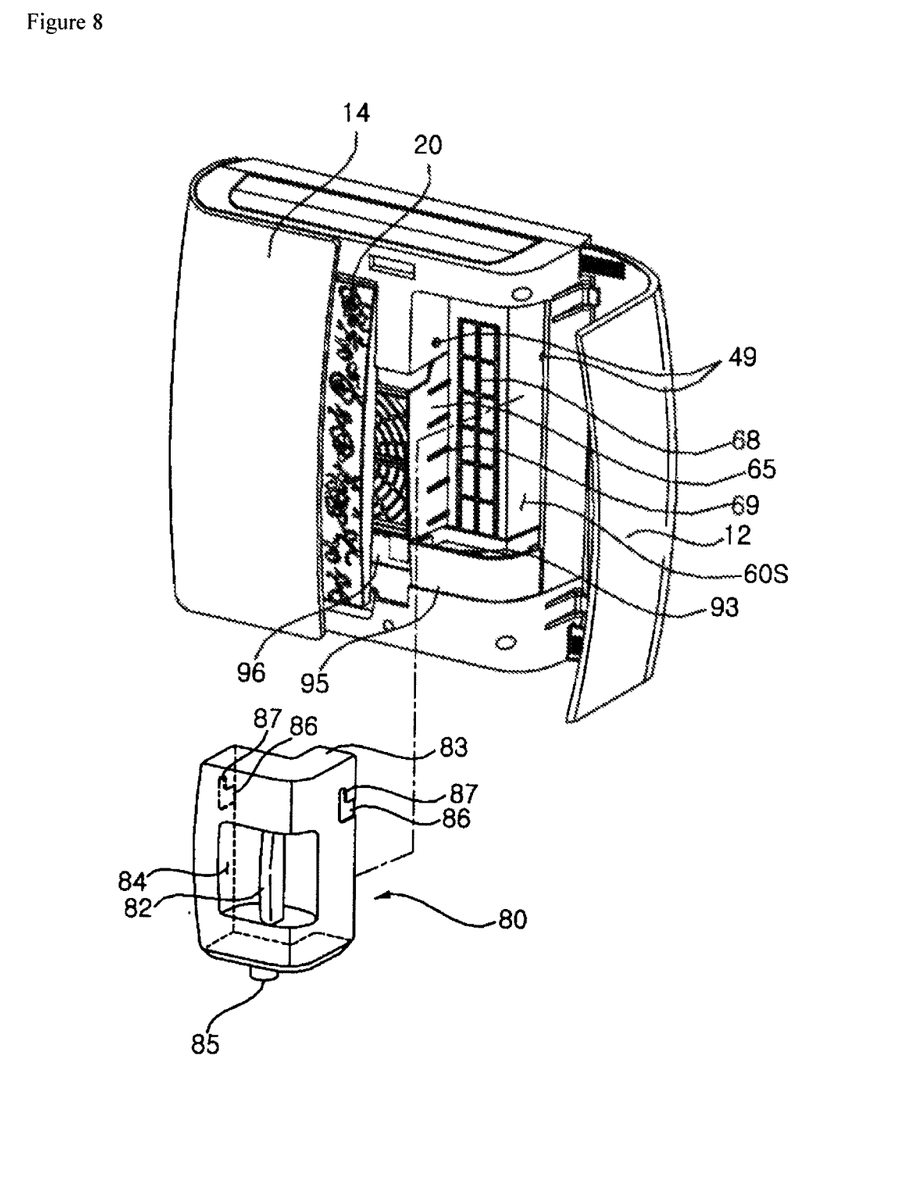
FIG. 8 is a perspective view of the humidifier from which a water tank is detached in the present embodiment.
Figure 9:
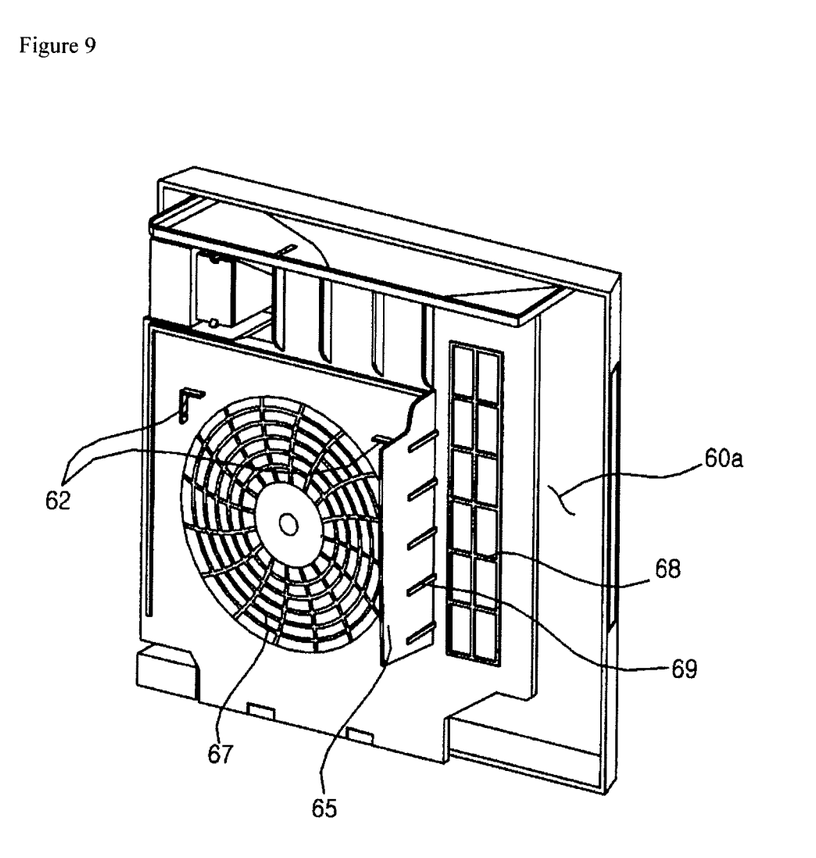
FIG. 9 is a perspective view showing that a rear casing and a fan housing are coupled together according to the present embodiment.

FIG. 1 is a perspective view showing a humidifier according to an embodiment of the present invention, FIG. 2 is a front view of the humidifier according to the present embodiment when a right door is opened, FIG. 3 is a front view of the humidifier according to the present embodiment when the right and left doors are opened, FIG. 4 is an exploded perspective view of the humidifier according to the present embodiment, FIG. 5 is a lateral cross-sectional view of the humidifier according to the present embodiment, FIG. 6 is a longitudinal cross-sectional view of an air conditioner according to the present embodiment, FIG. 7 is a perspective view of the humidifier from which a purification filter and a humidification filter are detached in the present embodiment, FIG. 8 is a perspective view of the humidifier from which a water tank is detached in the present embodiment, and FIG. 9 is a perspective view showing that a rear casing and a fan housing are coupled together according to the present embodiment.

Referring to FIGS. 1 to 9, the humidifier according to the present embodiment includes an air intake unit for sucking air and an air blower unit for blowing air, which are formed in a main body 2.

In the present embodiment, the humidifier is mounted on a wall in the state in which it is spaced apart from a flat surface at a specific interval. In the present embodiment, the humidifier is configured to suck air from the front and lower sides of the main body 2 and blow the air upwardly from the main body. The air intake unit and the air blower unit are described in more detail later.

The main body 2 includes a rear casing 30, a front casing 40, and front doors 12 and 14.

The rear casing 30 forms an external rear appearance of the main body 2. The rear casing 30 has a box form whose front is opened. Further, space is formed between the rear casing 30 and the front casing 40 to be described later.

The front casing 40 is placed in front of the rear casing 30. The front casing 40 has a box form whose rear is opened and forms a front external appearance of the humidifier. An air blower hole 6 for blowing air humidified within the main body 2 is formed on the upper portion of the front casing 40.

A blower vane 72 for adjusting the wind of blown air and a vane motor 74 for rotating the blower vane 72 are placed in the air blower hole 6.

An opening 4 is formed on the front side of the front casing 40. An indoor air sucked by the air intake unit passes through the opening 4 and a purification filter 110 in order. Further, a water tank 80 and a water guide 90 enter or exit from the main body 2 through the opening 4.

The opening 4 is partitioned into a portion into which indoor air is sucked and a portion into which the water tank 80 is inserted by the partition wall 65 of a fan housing 60. A purification filter 110 for purifying alien substance among an indoor air passing therethrough is placed in the portion into which the indoor air is sucked, of the opening 4. One or more locking projections 49 with which the latch grooves 86 and 87 of the water tank 80 are engaged are formed in the portion into which the water tank of the front casing 40 is inserted.

The opening 4 may extend from the front side of the front casing 40 to a side where the water tank 80 is placed, thereby exposing the side of the water tank 80. Accordingly, a user can easily attach or detach the water tank 80 to or from the main body 2 through the opening 4. Further, a user can check a water level of the water tank 80 through the display window 13 of the door.

A lower intake hole 46 for sucking air is formed on the lower portion of the front casing 40. As described above, the humidifier according to the present embodiment may be placed in the state in which it is spaced apart from a flat surface at a specific interval. Accordingly, in the present embodiment, the lower intake hole 46 can be formed on the lower portion of the front casing 40 in order to suck air. Alternatively, the lower intake hole 46 may be formed in front of the opening 4.

The front door 10 includes a left door 14 and a right door 12.

The left door 14 is rotatably coupled to the left side of the front casing 40, and the right door 12 is rotatably coupled to the right side of the front casing 40. However, the door 10 may include an upper door rotatably placed on the upper side of the front casing 40 and a lower door rotatably placed on the lower side of the front casing 40. Alternatively, three or more doors may be rotatably coupled to the main body.

In the case in which the door 10 is coupled to the front casing while covering the opening 4 of the front casing 40, the door 10 may form air intake ducts in various ways.

In the present embodiment, the left door 14 and the right door 12 may be rotated to thereby cover the front casing 40 and, at the same time, form the air intake ducts while exposing part of the opening 4. Further, in the present embodiment, a display 20 is placed at a position where the opening 4, which is exposed when the right and left doors 12 and 14 are closed, is not seen from the front. The display 20 is placed in the rear of the right and left doors 12 and 14 so that air intake ducts 16 and 18 can be formed between the display 20 and the right and left doors 12 and 14.

The display 20 may be coupled to any one of the right and left doors 12 and 14. In the present embodiment, the display 20 is placed so that the air intake duct 18 is formed in the right door 12.

The display window 13 through which a water level of the water tank can be checked outside the main body 2 is formed in one of the right and left doors 12 and 14, which covers the water tank 80.

Meanwhile, information about the operation of the humidifier may be displayed on the display 20. A variety of patterns for increasing a feeling of beauty may be formed in the display 20 because the display 20 is exposed from the front side of the humidifier.

The fan housing 60, the water tank 80, the purification filter 110, the humidification filter 100, the water guide 90, and a control box 160 are placed within the main body 2 (that is, space between the front casing 40 and the rear casing 30).

The fan housing 60 is placed in the space between the front casing 40 and the rear casing 30. The fan housing 60 has a box form whose rear side is open and combines the rear casing 30, thus forming a ventilation room. A blower fan 56 and a motor 54 for rotating the blower fan 56 are placed in the ventilation room. An air blower unit 64 is formed on the upper side of a circumference portion of the fan housing 60 and configured to communicate with the air blower hole 6 of the front casing 40.

An air intake unit 67 is formed on the front side of the fan housing 60. A safety network may be placed in the air intake unit 67. The humidification filter 100 for supplying moisture to air passing through the air intake unit 67 is placed in front of the air intake unit 67. Further, humidification filter settlement units 62 that fix the humidification filter 100 are formed in the outer circumference of the air intake unit 67, of the front side of the fan housing 60.

The humidification filter settlement units 62 may be formed in the outer circumference of the air intake unit 67 so that they correspond to a shape of the humidification filter 100. In the present embodiment, a shape corresponding to an upper corner shape of the humidification filter 100 is projected upwardly from the air intake unit 67 so that it can fix the upper corner of the humidification filter 100 having a square shape.

The partition wall 65 is projected forwardly from the fan housing 60. The partition wall 65 is projected toward a side into which the water tank 80 is inserted, of the right and left sides of the air intake unit 67.

The partition wall 65 partitions the front side of the fan housing 60 into space into which air is sucked and space into which the water tank 80 is placed. Further, the partition wall 65 partitions the opening 4 of the front casing 40 into space into which air is sucked and space into which the water tank 80 is inserted. Accordingly, the partition wall 65 is placed between the humidification filter 100 and the water tank 80, which are placed in front of the air intake unit 67.

Ribs 69 are formed on portions in contact with part of the rear surface of the water tank 80, of the front surface of the fan housing 60. Ribs 68 are also formed on portions in contact with the lateral surface of the water tank 80, of both surfaces of the partition wall 65. The ribs 68 and 69 function to reduce a shock applied from the water tank 80 to the fan housing 60 when the water tank 80 is mounted in the fan housing 60. The ribs 68 and 69 also function to prevent vibration from transferring to the water tank 80 via the fan housing 60 when the humidifier is driven by preventing the fan housing 60 and the water tank 80 from coming into contact with each other.

Space 60a into which the backward projection portion 83 of the water tank 80 is inserted and accommodated may be formed between the portion of the front side of the fan housing 60, wherein the water tank 80 is placed, and the rear casing. Accordingly, the utilization of space within the main body 2 of the water tank 80 can be increased, and the size of the water tank can be increased.

The water guide 90 functions to receive water from the water tank 80 and supply the received water to the humidification filter 100. The water guide 90 is detachably coupled to the inside of the main body 2 through the opening 4 of the front casing 40.

The water guide 90 includes a water tank settlement unit 95, an accommodation unit 96, a float mounter 97, and a discharge accommodation unit 98. Water introduced from the water tank 80 to the water tank settlement unit 95 flows through the accommodation unit 96, the float mounter 97, and the discharge accommodation unit 98 in order.

The water tank 80 is inserted into and mounted in the water tank settlement unit 95. In more greater detail, the bottom of the water tank 80 is inserted into the water tank settlement unit 95, and the water tank settlement unit 95 is formed to have a shape corresponding to the bottom shape of the water tank 80. Accordingly, the water tank settlement unit 95 also functions to fix the water tank 80 thereto.

Meanwhile, an ion purification resin filter 93 for making soft hard water by lowering the hardness of hard water in such a manner that ions coated on the resin surface of the ion purification resin filter 93 substitute Ca and Mg, which decide the hardness of water, is placed in the water tank settlement unit 95. A hole through which the cap 85 of the water tank is inserted is formed in the ion purification resin filter 93.

In the case in which the water tank 80 is inserted into and mounted in the water tank settlement unit 95 through the hole of the ion purification resin filter 93, a projection 91 for moving a valve body in order to open the flow passage of the cap 85 is formed in the water tank settlement unit 95.

Consequently, the water tank settlement unit 95 enables the water tank 80 to be mounted therein and also the water of the water tank 80 to flow through the accommodation unit 96 via the ion purification resin filter 93.

The humidification filter 100 is inserted into and mounted in the accommodation unit 96. Further, the accommodation unit 96 supplies moisture to the humidification filter 100 while accommodating the water drained from the water tank settlement unit 95. That is, the humidification filter 100 is inserted into the accommodation unit 96 and has its bottom fixed thereto. Further, the top of the humidification filter 100 is fixed to the humidification filter settlement units 62. Consequently, the humidification filter 100 is stably fixed by the accommodation unit 96 and the humidification filter settlement units 62.

Meanwhile, the purification filter 110 is placed in front of the humidification filter 100. Accordingly, the accommodation unit 96 is depressed backward, thereby forming a space 90a in which the bottom of the purification filter 100 is placed. The bottom of the fan housing 60 is placed on the rear side of the accommodation unit 96. Accordingly, the accommodation unit 96 is depressed in a forward direction, thereby forming a space 90b in which the bottom of the fan housing 60 is placed. Accordingly, according to the present embodiment, the main body 2 can be made slim.

In the case in which the front and rear of the accommodation unit 96 are depressed as described above, the accommodation unit 96 may have a width corresponding to the width of the humidification filter 100 so that the humidification filter 100 can be inserted into and fixed to the accommodation unit 96.

The float mounter 97 is formed to communicate with the accommodation unit 96. A float 92 for detecting a water level of the water guide 90 is placed in the float mounter 97. Further, a float sensor (not shown in the drawing) for detecting the height of the float is placed on the top of the float 92 within the main body 2.

Accordingly, when the float 92 has a specific height or more, the operation of the humidifier is stopped in order to prevent an electric leakage, which may happen due to overfill of the water guide 90.

The discharge accommodation unit 98 forms space where a discharge unit 94 may come into contact with the water accommodated in the water guide 90. The discharge accommodation unit 98 may be formed in various portions of the water guide 90, but, in the present embodiment, formed on the rear side of the float mounter 97 in order to use the space within the main body 2. Further, as described above, the accommodation unit 96, the float mounter 97, and the discharge accommodation unit 98 are formed to communicate with each other. Accordingly, water sterilized by the discharge accommodation unit 98 flows into the float mounter 97 and the accommodation unit 96, so that the sterilized water is supplied to the humidification filter 100 inserted into the accommodation unit 96.

The discharge unit 94 is placed in space on the top of the discharge accommodation unit 98 so that it comes into contact with the water accommodated in the discharge accommodation unit 98. The discharge unit 94 sterilizes water using $H_2O_2$ generated by generating discharge in the water. Further, a power source unit (not shown in the drawing) for supplying electricity to the discharge unit 94 may be placed within the main body 2.

The water tank 80 is seated in the water tank settlement unit 95 and is configured to supply water to the accommodation unit 96, the float mounter 97, and the discharge accommodation unit 98. The water tank 80 is attached to or detached from the inside of the main body 2 through the opening 4 of the front casing 40. The latch grooves 86 and 87 inserted into the locking projections 49 of the front casing 40 are formed in the water tank 80. The latch grooves 86 and 87 may be formed at various portions of the water tank 80 in various numbers. However, in the present embodiment, a pair of the latch grooves 86 and 87 is formed on the right and left surfaces of the water tank 80. Accordingly, a pair of the locking projections 49 is also formed at portions of the front casing 40, which correspond to the latch grooves 86 and 87.

The pair of latch grooves 86 and 87 include a locking portion 87 with which the locking projection 49 is engaged and a guide portion 86 for guiding the locking projection 49. In more greater detail, the water tank 80 is inserted into the main body 2 through the opening 4 of the front casing 40, and the guide portions 86 of the water tank 80 are inserted into the respective locking projections 49 formed in the front casing 40. Further, the locking projections 49 are led to the respective locking portions 87 by the guide portions 86, so that the locking projections 49 fix the water tank 80 to the inside of the main body 2. Further, as described above, the water tank 80 is inserted into and fixed to the water tank settlement unit 95 and comes into line contact with the ribs 68 and 69 on the front surface of the partition wall 65 and the fan housing 60.

The backward projection portion 83, which projects backward, is formed in one of the right and left sides of the water tank 80. The backward projection portion 83 is inserted into the space 60a between the rear casing 30 and the front surface of the fan housing 60. Accordingly, according to the present embodiment, the space within the main body 2 can be made compact, and a great amount of water can be contained in the water tank 80.

A depressed portion 84 is formed on the front side of the water tank 80. A handle 82 is formed in the depressed portion 84. Accordingly, a user can put his hands into the depressed portion 84, grasp the handle 82, and conveniently attach or detach the water tank 80 through the opening of the front casing 40.

A hole portion that water enters or exit from is formed in the water tank 80. The cap 85 for controlling the water is placed in the hole portion. A flow passage through which the water passes is formed in the cap 85, and a valve body is movably placed in the cap 85 so that it opens or closes the flow passage. The cap 85 enables the valve body to move into the water tank 80 by the projection 91, which is formed in the water tank settlement unit 95, when the water tank 80 is seated in the water guide 90 and to open the flow passage of the cap 85. Accordingly, the water within the water tank 80 is introduced into the hole portion of the ion purification resin filter 93.

When the water tank 80 is pulled out from the above-described humidifier, a user rotates the door 12, which is placed in front of the water tank 80, sideways. At this time, the water tank 80 is exposed to the outside through the opening 4.

If a user puts his hands into the opening 4, grasps the front part (in particular, the handle 82 of the water tank 80 and then raises the water tank 80 up to a specific height, the cap 85 of the water tank 80 is unlocked from the hole formed in the ion purification resin filter 93, and the locking portions 87 are released from the locking projections 49.

Next, if the user pulls the water tank 80 in an upper forward direction while obliquely rotating it forwardly, the water tank 80 obliquely exits between the front casing 40 and the partition wall 65 while the guide portions 86 are guided by the locking projections 49, and then exits to the outside through the opening 4.

To the contrary, in the case in which the water tank 80 is mounted in the main body 2, if a user obliquely places the water tank 80 at an upper forward position of the water guide 90 and then obliquely pushes the water tank 80 between the front casing 40 and the partition wall 65, the guide portions 86 guide the insertion of the water tank 80 while being guided by the locking projections 49.

If the water tank 80 stands vertically and is then pulled in a downward direction, both upper sides of the water tank 80 are latched while the locking portions 87 are engaged with the respective locking projections 49. At this time, the water tank 80 is raised on the top of the water tank settlement unit 95 of the water guide 90, and all or part of the cap 85 is engaged with the hole formed in the ion purification resin filter 93.

Meanwhile, the humidification filter 100 provides moisture to the air passing through the humidification filter 100. Accordingly, the humidification filter 100 absorbs the water of the accommodation unit 96 while the bottom of the humidification filter 100 is inserted into the accommodation unit 96 of the water guide 90. The water absorbed by the humidification filter 100 is naturally evaporated by the air that has passed through the purification filter 110, and the air is then humidified and blown into a room.

The control box 160 controls a variety of sensors of the humidifier. In the present embodiment, the control box 160 is coupled to the upper portion of the partition wall 65 of the front of the fan housing 60 via a fixing member. Accordingly, an electric leakage, which may happen due to the contact of moisture within the main body 2 with the control box 160, can be prevented.

The operation of the present invention having the above construction is described below.

When the humidifier is operated, an indoor air flows in the main body 2 via the air intake ducts 16 and 18 formed between the right and left doors 12 and 14 and the display 20 and the lower intake hole 46. Alien substance is removed from the flown air while passing through the purification filter 110 of the opening 4 of the front casing 40.

At this time, the opening 4 is partitioned into a portion into which the indoor air is sucked and a portion into which the water tank 80 is placed by the partition wall 65. Accordingly, noise occurring due to an unnecessary flow of the air within the main body can be prevented because the air sucked into the main body 2 does not flow toward the water tank.

The air that has passed through the purification filter 110 absorbs moisture while passing through the humidification filter 100. The humidified air flows in the ventilation room, which is formed by the fan housing 60 and the rear casing 30, through the air intake unit 67 of the fan housing 60 and then blown into a room through the air blower unit 64 of the fan housing 60 and the air blower hole 6 of the front casing 40.

While the invention has been shown and described with respect to the embodiments, it will be understood by those skilled in the art that various changes and modifications may be made without departing from the spirit and scope of the invention as defined in the following claims.

The invention claimed is:

1. A humidifier, comprising:
   a rear casing;
   a front casing placed in front of the rear casing and having an opening formed on its front side;
   a fan housing having an air intake unit formed on its front side, wherein an air blower unit is formed on one side of a circumference part of the fan housing;
   a humidification filter placed in front of the air intake unit; and
   a water tank placed on a side of the humidification filter,
   wherein the fan housing has a partition wall projected therefrom between the humidification filter and the water tank, and the partition wall partitions a front side of the fan housing into a space through which air passes and a space where the water tank is placed.

2. The humidifier of claim 1, wherein humidification filter settlement units for fixing the humidification filter are formed on the fan housing.

3. The humidifier of claim 1, wherein:
   the water tank has a backward projection portion formed in one of its right and left sides, and
   a space into which the projection portion is inserted and accommodated is formed between the fan housing and the rear casing.

4. The humidifier of claim 1, wherein:
   the water tank has a depressed portion formed on its front side, and
   a handle is formed in the depressed portion.

5. The humidifier of claim 1, wherein;
   locking projections are formed in the front casing, and
   latch grooves to which the respective locking projections are led and latched are formed in the water tank.

6. The humidifier of claim 5, wherein the latch grooves comprise:
   a locking portion with which each of the locking projections is engaged, and
   a guide portion led to each of the locking projections.

7. The humidifier of claim 1, further comprising:
   a control box for controlling the humidifier,
   wherein the control box is placed on an upper side of the partition wall.

8. The humidifier of claim 1, wherein ribs are formed on a surface in contact with the water tank of the partition wall.

9. The humidifier of claim 1, wherein ribs are formed on a surface adjacent to the water tank, of a front side of the fan housing.

10. The humidifier of claim 1, further comprising:
    an accommodation unit into which a bottom of the humidification filter is inserted, and
    a water guide including a water tank settlement unit in which the water tank is settled,
    wherein a rear side of the accommodation unit is depressed in a forward direction, thus forming a space in which a bottom of the fan housing is placed.

* * * * *